(12) United States Patent
Lombard et al.

(10) Patent No.: US 8,191,367 B2
(45) Date of Patent: Jun. 5, 2012

(54) SLIDING PISTON CARTRIDGE AND TURBOCHARGER INCORPORATING SAME

(75) Inventors: Alain R. Lombard, Uxegney (FR);
Jerome Mitka, Houdemont (FR);
Philippe Le Gouareguer, Les Forges (FR); Jocelyn Antoine, Epinal (FR)

(73) Assignee: Honeywell International Inc., Morristown, NJ (US)

( * ) Notice: Subject to any disclaimer, the term of this patent is extended or adjusted under 35 U.S.C. 154(b) by 912 days.

(21) Appl. No.: 12/093,747

(22) PCT Filed: Nov. 16, 2005

(86) PCT No.: PCT/US2005/041356
§ 371 (c)(1),
(2), (4) Date: Oct. 6, 2008

(87) PCT Pub. No.: WO2007/058647
PCT Pub. Date: May 24, 2007

(65) Prior Publication Data
US 2009/0077966 A1    Mar. 26, 2009

(51) Int. Cl.
| F02D 23/00 | (2006.01) |
| F01D 17/14 | (2006.01) |
| F01D 17/16 | (2006.01) |
| F01D 17/18 | (2006.01) |
| F01D 9/06  | (2006.01) |
| F02C 9/20  | (2006.01) |
| F02C 6/12  | (2006.01) |

(52) U.S. Cl. .................. 60/602; 415/157; 415/158

(58) Field of Classification Search .......... 60/602; 415/157–164; F01D 9/06, 17/14, 17/16, F01D 17/18; F02C 9/20, 6/12
See application file for complete search history.

(56) References Cited

U.S. PATENT DOCUMENTS

| 6,536,214 B2 * | 3/2003 | Finger et al. .............. 60/602 |
| 6,715,288 B1   | 4/2004 | Engels et al. ............ 415/158 |
| 6,928,816 B2 * | 8/2005 | Leavesley ................ 60/602 |
| 7,047,739 B2 * | 5/2006 | Fledersbacher et al. ...... 60/602 |

(Continued)

FOREIGN PATENT DOCUMENTS
DE    4303520 C1 * 9/1994
(Continued)

OTHER PUBLICATIONS

ISR/WO Honeywell, Date of Actual Completion: Jul. 24, 2006.

*Primary Examiner* — Thai Ba Trieu
(74) *Attorney, Agent, or Firm* — Alston & Bird LLP

(57) ABSTRACT

A sliding piston cartridge (50) for a turbocharger (20) that is insertable into a bore (44) in the turbine housing (38) as a unit and that includes all of the components of a sliding piston type variable nozzle. The sliding piston cartridge comprises a carrier (52) having a tubular portion that interfaces with the bore of the turbine housing. A sliding piston (62) is disposed within the carrier and makes sliding contact therewith. Vanes (58) are mounted on or formed as a part of the carrier at its upstream end, the vanes extending across a turbine nozzle. The piston slides between a closed position and an open position relative to the carrier. The tubular portion of the carrier can include openings (66) that are progressively uncovered by the piston as it moves toward the open position, to allow additional flow to enter the turbine wheel without passing through the vanes.

15 Claims, 7 Drawing Sheets

U.S. PATENT DOCUMENTS

| | | | |
|---|---|---|---|
| 7,338,254 B2 * | 3/2008 | Lombard et al. | 415/167 |
| 7,762,067 B2 * | 7/2010 | Bouvier et al. | 60/602 |
| 2002/0043066 A1 | 4/2002 | Finger et al. | 60/602 |
| 2004/0025504 A1 | 2/2004 | Perrin et al. | 415/157 |
| 2009/0246003 A1 * | 10/2009 | Roberts et al. | 415/168.1 |

FOREIGN PATENT DOCUMENTS

| | | |
|---|---|---|
| WO | 2004025088 | 3/2004 |
| WO | 2004048755 | 6/2004 |
| WO | 2005040560 | 5/2005 |

* cited by examiner

SLIDING PISTON CARTRIDGE AND TURBOCHARGER INCORPORATING SAME

BACKGROUND OF THE INVENTION

The present invention relates generally to turbochargers, and relates more particularly to exhaust gas-driven turbochargers having an axially sliding piston for varying the size of a nozzle opening leading into the turbine wheel of the turbine so as to regulate flow through the turbine.

Regulation of the exhaust gas flow through the turbine of an exhaust gas-driven turbocharger provides known operational advantages in terms of improved ability to control the amount of boost delivered by the turbocharger to the associated internal combustion engine. The regulation of exhaust gas flow is accomplished by incorporating variable geometry into the nozzle that leads into the turbine wheel. By varying the size of the nozzle flow area, the flow into the turbine wheel can be regulated, thereby regulating the overall boost provided by the turbocharger's compressor.

Variable-geometry nozzles for turbochargers generally fall into two main categories: variable-vane nozzles, and sliding-piston nozzles. Vanes are often included in the turbine nozzle for directing the exhaust gas into the turbine in an advantageous direction. Typically a row of circumferentially spaced vanes extend axially across the nozzle. Exhaust gas from a chamber surrounding the turbine wheel flows generally radially inwardly through passages between the vanes, and the vanes turn the flow to direct the flow in a desired direction into the turbine wheel. In a variable-vane nozzle, the vanes are rotatable about their axes to vary the angle at which the vanes are set, thereby varying the flow area of the passages between the vanes.

In the sliding-piston type of nozzle, the nozzle may also include vanes, but the vanes are fixed in position. Variation of the nozzle flow area is accomplished by an axially sliding piston that slides in a bore in the turbine housing. The piston is tubular and is located just radially inwardly of the nozzle. Axial movement of the piston is effective to vary the axial extent of the nozzle opening leading into the turbine wheel. When vanes are included in the nozzle, the piston can slide adjacent to radially inner (i.e., trailing) edges of the vanes; alternatively, the piston and vanes can overlap in the radial direction and the piston can include slots for receiving at least a portion of the vanes as the piston is slid axially to adjust the nozzle opening.

The sliding-piston type of variable nozzle offers the advantage of being mechanically simpler than the variable-vane nozzle. Nevertheless, other drawbacks have generally been associated with sliding-piston type variable nozzles. In many cases a linkage coupled to the piston for effecting axial movement of the piston has been disposed in the exhaust gas flow stream exiting the turbine. For example, the downstream end of the piston has often been attached to arms that connect to a control rod of an actuator located adjacent an exterior side of the turbine housing directly behind the piston. The control rods penetrates through an opening in the turbine housing. The presence of the control rod and arms in the flow stream deleteriously affects the flow of the exhaust gas, which impairs turbocharger performance.

Another disadvantage of some sliding-piston type variable nozzles is that the sliding piston directly engages the inner surface of the bore in the turbine housing. Consequently, the bore must be machined to precise dimensional tolerances to ensure proper sealing between the piston and bore. The bore is relatively large, and thus a significant amount of precision machining must be performed.

In some turbochargers with sliding-piston variable nozzles that include fixed vanes, the vanes are mounted on a shroud that is mounted between the center housing and the turbine housing. Changes in nozzle design often require changes in the shroud design, which in turn can require changes in some aspects of the center housing design. This is undesirable because the center housing is a relatively expensive component.

BRIEF SUMMARY OF THE INVENTION

The present invention addresses the above needs and achieves other advantages by providing a sliding piston cartridge for a turbocharger that is insertable into a bore in the turbine housing as a unit and that includes all of the components of the sliding piston type variable nozzle. Vanes are included as a part of the cartridge, allowing the vaned shroud required by some existing turbochargers to be omitted. The sliding piston cartridge accordingly offers the potential to employ a common turbine housing and center housing with different cartridges. The bore of the turbine housing into which the cartridge is inserted does not require precise machining because the piston makes sliding engagement with a carrier of the cartridge rather than directly engaging the turbine housing bore. The carrier is a substantially smaller component than the turbine housing, such that the amount of precision machining required for the carrier is substantially less than what would be required for machining the bore of the turbine housing in a conventional sliding piston arrangement.

In accordance with one embodiment of the invention, the cartridge comprises a carrier structured and arranged to be inserted axially into the bore of the turbine housing with a radially outer surface of the carrier engaging an inner surface of the bore, the carrier having a tubular portion defining a central bore therethrough substantially coaxial with the turbine housing bore, the tubular portion having an upstream end and a downstream end with respect to a flow direction of exhaust gas through the central bore. The carrier further comprises an array of circumferentially spaced vanes axially projecting from the upstream end of the tubular portion, the vanes having fixed ends joined to the tubular portion and free ends that are adjacent a wall of the turbine housing when the carrier is inserted into the bore thereof. The tubular portion defines circumferentially spaced openings downstream of the fixed ends of the vanes, the vanes defining a first nozzle portion and the circumferentially spaced openings defining a second nozzle portion for directing exhaust gas from the chamber into the turbine wheel.

The cartridge further comprises a tubular piston disposed in the central bore of the carrier such that the piston is axially slidable relative to the carrier between a closed position and an open position, the piston in the closed position substantially blocking exhaust gas from passing through the second nozzle portion to the turbine wheel, the piston progressively unblocking the second nozzle portion as the piston travels toward the open position. Preferably, in the closed position of the piston, the first nozzle portion remains open or at least partially open. In one embodiment, the tubular portion of the carrier defines a ring disposed between the fixed ends of the vanes and the circumferentially spaced openings, the ring having a portion that extends radially inwardly and is positioned to be abutted by an upstream end of the piston in the closed position thereof.

In accordance with a further embodiment of the invention, the ring is omitted and there is radial overlap between the piston and at least trailing edge portions of the vanes. The piston includes recesses or indentations for receiving the trailing edge portions of the vanes when the piston is in the closed position.

In a preferred embodiment of the invention, the carrier has an axial length exceeding that of the piston. Preferably, the piston is arranged with respect to the carrier such that a downstream end of the piston does not project axially beyond the downstream end of the carrier in the open position of the piston. Thus, the piston is entirely contained within the carrier. The substantial length of the carrier facilitates proper guidance of the sliding movement of the piston.

In one embodiment of the invention, the tubular portion of the carrier defines a pair of circumferentially spaced apertures passing through a side wall of the tubular portion. The cartridge includes a mechanism for sliding the piston in the carrier, the mechanism comprising a pair of arms having distal ends that extend through the apertures in the side wall and engage the piston. The arms have proximal ends joined to a base, the arms and base forming a fork member, the fork member being rotatable about an axis that extends transversely relative to an axis of the piston such that the arms axially move the piston. Preferably, the apertures in the carrier are diametrically opposite each other and the distal ends of the arms engage the piston at diametrically opposite locations. A rotary member is coupled to the base such that the base rotates with the rotary member. An actuator is connected to the rotary member for rotating the rotary member in order to axially move the piston within the carrier.

In another embodiment of the invention, the carrier defines at least one bypass passage through a side wall of the tubular portion of the carrier, the at least one bypass passage being positioned to be blocked by the piston when the piston is in the closed position and to be uncovered by the piston when the piston is moved toward the open position such that a portion of exhaust gas flows from the chamber of the turbine housing through the at least one bypass passage. In this manner, the bypassed portion of the exhaust gas does not pass through the turbine wheel or through the central passage of the piston.

The invention also encompasses a turbocharger incorporating a sliding piston cartridge. The turbocharger comprises a center housing containing a bearing assembly and a rotary shaft mounted in the bearing assembly, a compressor wheel affixed to one end of the shaft and disposed in a compressor housing coupled to one side of the center housing, and a turbine wheel affixed to an opposite end of the shaft and disposed in a turbine housing coupled to an opposite side of the center housing. The turbine housing defines a chamber surrounding the turbine wheel for receiving exhaust gas to be directed into the turbine wheel. A sliding piston cartridge is inserted axially into the bore of the turbine housing. Preferably, the sliding piston cartridge is insertable into and removable from the turbine housing bore as a unit.

The cartridge comprises a carrier having a radially outer surface engaging an inner surface of the bore, the carrier having a tubular portion defining a central bore therethrough substantially coaxial with the turbine housing bore. The tubular portion has an upstream end and a downstream end with respect to a flow direction of exhaust gas through the central bore, the carrier further comprising an array of circumferentially spaced vanes axially projecting from the upstream end of the tubular portion. The vanes have fixed ends joined to the tubular portion and free ends that are adjacent a wall of the turbine housing. The tubular portion defines circumferentially spaced openings downstream of the fixed ends of the vanes, the vanes defining a first nozzle portion and the circumferentially spaced openings defining a second nozzle portion for directing exhaust gas from the chamber into the turbine wheel.

The cartridge further comprises a tubular piston disposed in the central bore of the carrier such that the piston is axially slidable relative to the carrier between a closed position and an open position, the piston in the closed position substantially blocking exhaust gas from passing through the second nozzle portion to the turbine wheel, the piston progressively unblocking the second nozzle portion as the piston travels toward the open position.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
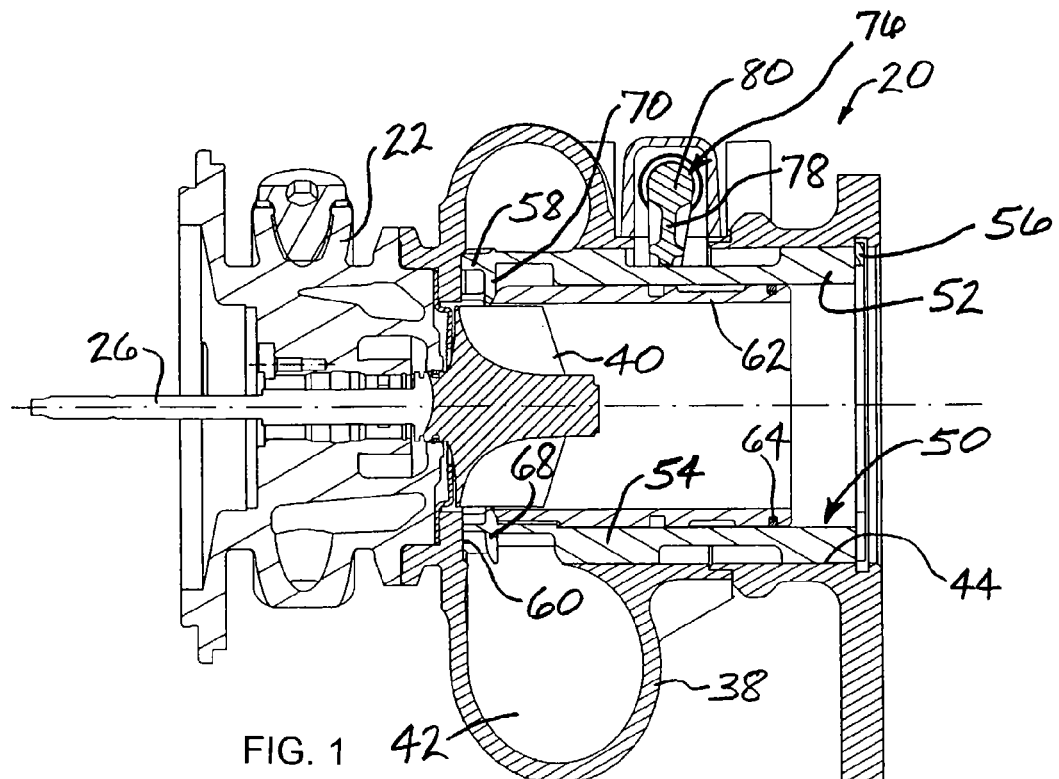
FIG. 1 is a cross-sectional view of a turbocharger in accordance with a first embodiment of the invention, with the piston in a fully closed position.

With reference to FIG. 1, a cross-sectional view of a turbocharger 20 having a sliding piston cartridge in accordance with a first embodiment of the invention is illustrated. The turbocharger includes a center housing 22 that contains bearings (not shown) for a rotary shaft 26 of the turbocharger. A compressor housing (not shown) is coupled to one side of the center housing. A compressor wheel (not shown) is mounted on one end of the shaft 26 and is disposed in the compressor housing. The compressor housing defines an inlet through which air is drawn into the compressor wheel, which compresses the air, and further defines a diffuser through which the compressed air is discharged from the compressor wheel into a volute surrounding the compressor wheel. From the volute, the air is delivered to the intake of an internal combustion engine (not shown).

The turbocharger further comprises a turbine housing 38 coupled to the opposite side of the center housing 22. A turbine wheel 40 is mounted on the opposite end of the shaft 26 from the compressor wheel and is disposed in the turbine housing. The turbine housing defines a chamber 42 that surrounds the turbine wheel 40 and receives exhaust gas from the internal combustion engine. Exhaust gas is directed from the chamber 42 into the turbine wheel 40, which expands the exhaust gas and is driven thereby so as to drive the compressor wheel.

The turbine housing 38 defines a generally cylindrical bore 44 whose diameter generally corresponds to a radially innermost extent of the chamber 42. The turbine wheel 40 resides in an upstream end of the bore 44 and the turbine wheel's rotational axis is substantially coaxial with the bore. The term "upstream" in this context refers to the direction of exhaust gas flow through the bore 44, as the exhaust gas in the chamber 42 flows into the turbine wheel 40 and is then turned to flow generally axially (left to right in FIG. 1) through the bore 44 to its downstream end.

The turbocharger 20 includes a sliding piston cartridge 50 that resides in the bore 44 of the turbine housing. The cartridge comprises a carrier 52 that has a generally tubular portion 54 whose outer diameter is slightly smaller than the diameter of the turbine housing bore 44 such that the carrier 52 can be slid axially into the bore 44 from its downstream end (i.e., slid right to left in FIG. 1). A retainer clip or ring 56 is snapped into a groove in the inner surface of the bore 44 behind the carrier 52 to retain the carrier in the turbine housing. The carrier 52 includes a plurality of circumferentially spaced vanes 58 mounted on or integrally formed with the upstream end of the tubular portion 54. The vanes extend in a generally axial direction and have free ends that abut or are closely adjacent to a wall 60 of the turbine housing that extends in a generally radially inwardly direction from the upstream side of the chamber 42. The vanes are circumferentially spaced about the circumference of the tubular portion 54, and the spaces between the vanes define flow passages for exhaust gas to flow from the chamber 42 into the turbine wheel 40. The vanes guide the gas flow so that the gas enters the turbine wheel in an advantageous direction.

The cartridge 50 further comprises a piston 62 of tubular form. The piston is coaxially disposed within the central bore of the carrier 52 and is slidable relative to the carrier in the axial direction. The piston includes at least one sealing ring 64 disposed in a groove in a radially outer surface of the piston for sealing against a radially inner surface of the carrier 52 as the piston slides. The piston is axially slidable between a closed position shown in FIG. 1, a partially open position shown in FIG. 2, and an open position shown in FIG. 3. In the closed position, the piston blocks a plurality of circumferentially spaced openings 66 that extend through the side wall of the tubular portion 54 of the carrier 52. The openings 66 are located just downstream of the fixed ends of the vanes 58. The carrier can include a ring 68 located between the fixed ends of the vanes and the openings 66. The ring can include a radially inner portion 70 that is generally annular in shape and that is abutted by the end of the piston 62 when in the closed position. Thus, when the piston is closed, exhaust gas can flow from the chamber 42 radially inwardly through a first nozzle portion defined between the turbine housing wall 60 and the ring 68 and into the turbine wheel 40. The vanes 58 extend across the first nozzle portion for guiding the flow through the first nozzle portion.

Figure 2:
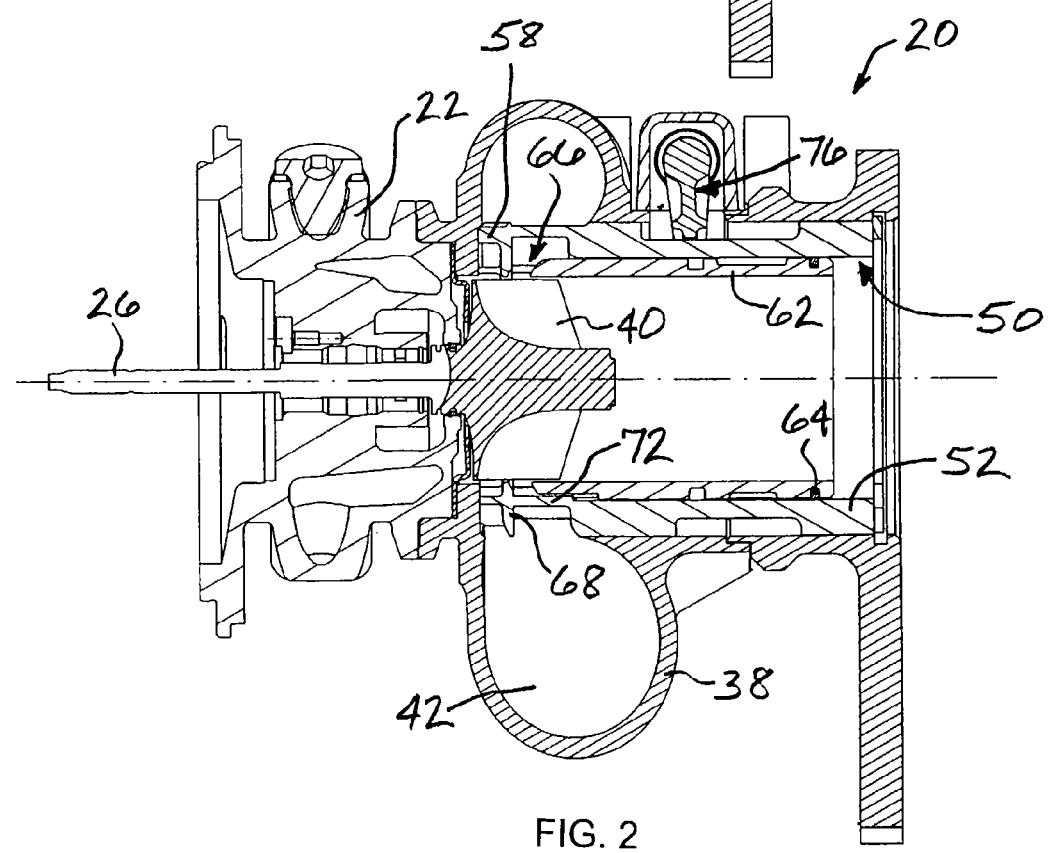
FIG. 2 is a view similar to FIG. 1, showing the piston in a partially open position.
Figure 3:
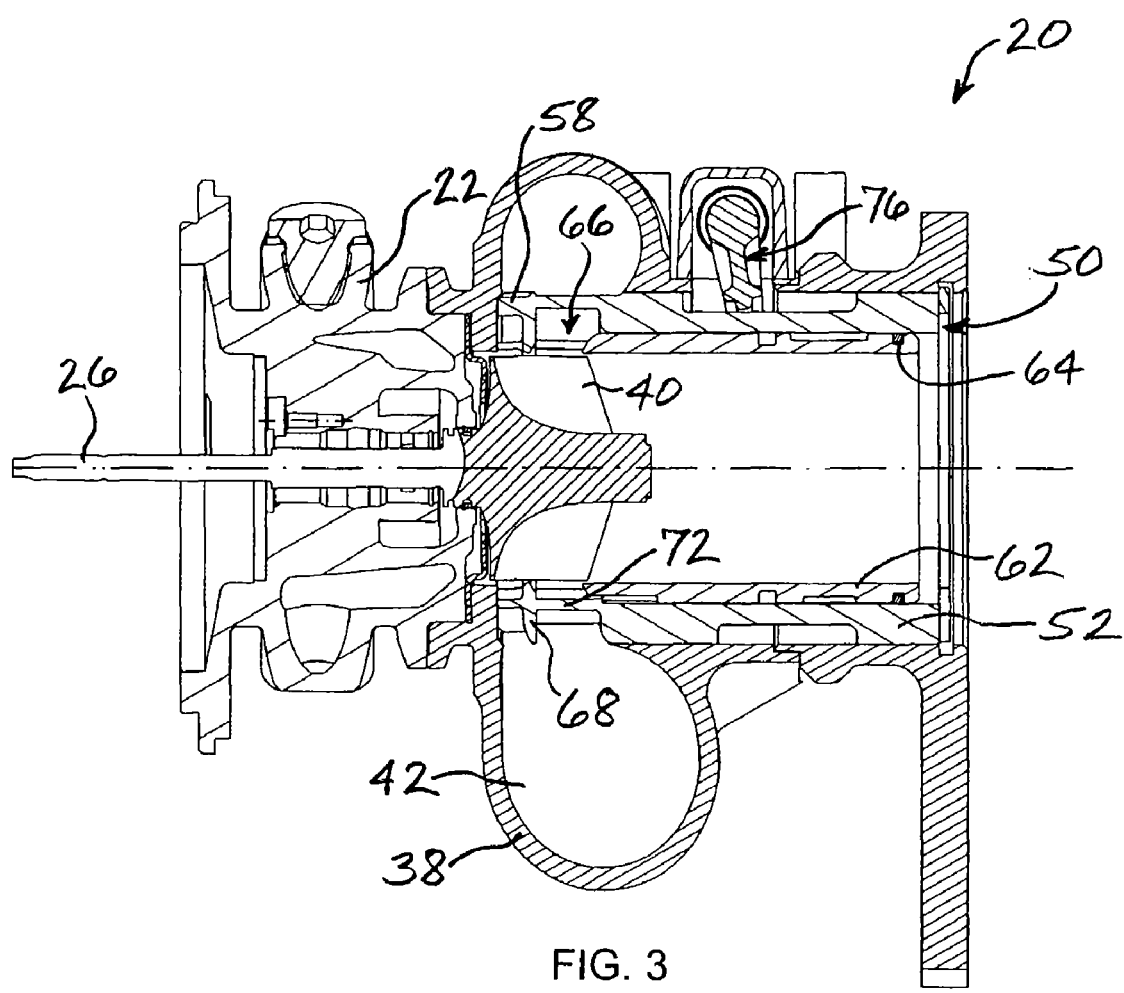
FIG. 3 is a view similar to FIG. 1, showing the piston in a fully open position.
Figure 4:
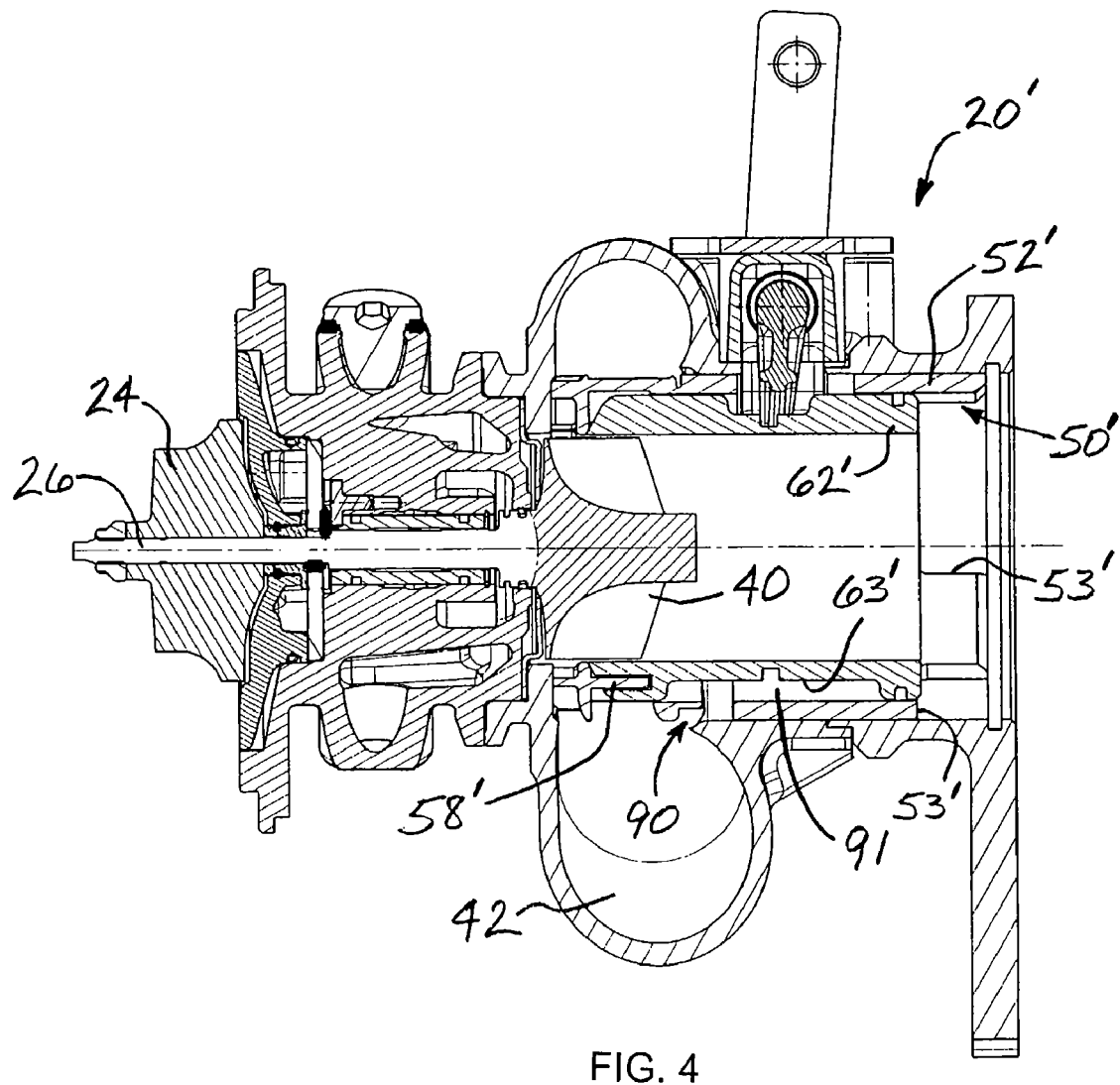
FIG. 4 is a cross-sectional view of a turbocharger in accordance with a second embodiment of the invention, with the piston in a fully closed position.

FIG. 2 shows the piston 62 in a partially open position, and FIG. 3 shows the piston fully open. In the partially open position, the piston 62 partially unblocks the openings 66 so that exhaust gas can flow from the chamber 42 through the unblocked portions of the openings 66 to the turbine wheel. The openings 66 define a second nozzle portion for the gas flow. The second nozzle portion can be without vanes, although there can be connecting portions 72 of the carrier 52 that exist between the openings 66 that can be shaped generally as vanes or can be shaped to provide some flow-guiding function. The connecting portions can be substantially fewer in number than the vanes 58.

In the fully open position of the piston as depicted in FIG. 3, the piston 62 fully unblocks the openings 66. If desired, the openings 66 can be dimensioned in the axial direction so that when they are fully unblocked, some of the exhaust gas flowing inwardly through the openings 66 bypasses the turbine wheel 40 and flows directly into the central passage of the piston 62; this is referred to herein as "internal bypass". The remainder of the gas flowing in through the openings 66 passes through at least part of the turbine wheel. Alternatively, the openings can be configured to not provide any internal bypass. Additionally, as in the partially open position of the piston, the gas that enters the wheel through the first nozzle portion passes through the entire wheel.

From the foregoing description of the turbocharger 20, it will be appreciated that assembly of the turbocharger is facilitated by the provision of the sliding piston cartridge 50. The cartridge advantageously is slidable as a unit into the bore 44 of the turbine housing. A further advantage is that the bore 44 need not be precision machined as required in conventional units wherein a piston slides in direct contact with the turbine housing bore. The inner dimension of the carrier 52 must be held to close tolerance, but the carrier is substantially smaller than the turbine housing and hence a significant reduction in the amount of precision machining is made possible by this embodiment of the invention. Yet another advantage of this embodiment is that modifications to the geometries of the vanes 58 and/or the piston 62 or carrier 52 can be made without having to alter the turbine housing 38 or center housing 22. Thus, potentially a plurality of differently configured cartridges 50 can be used with the same turbine housing and center housing.

Figure 7:
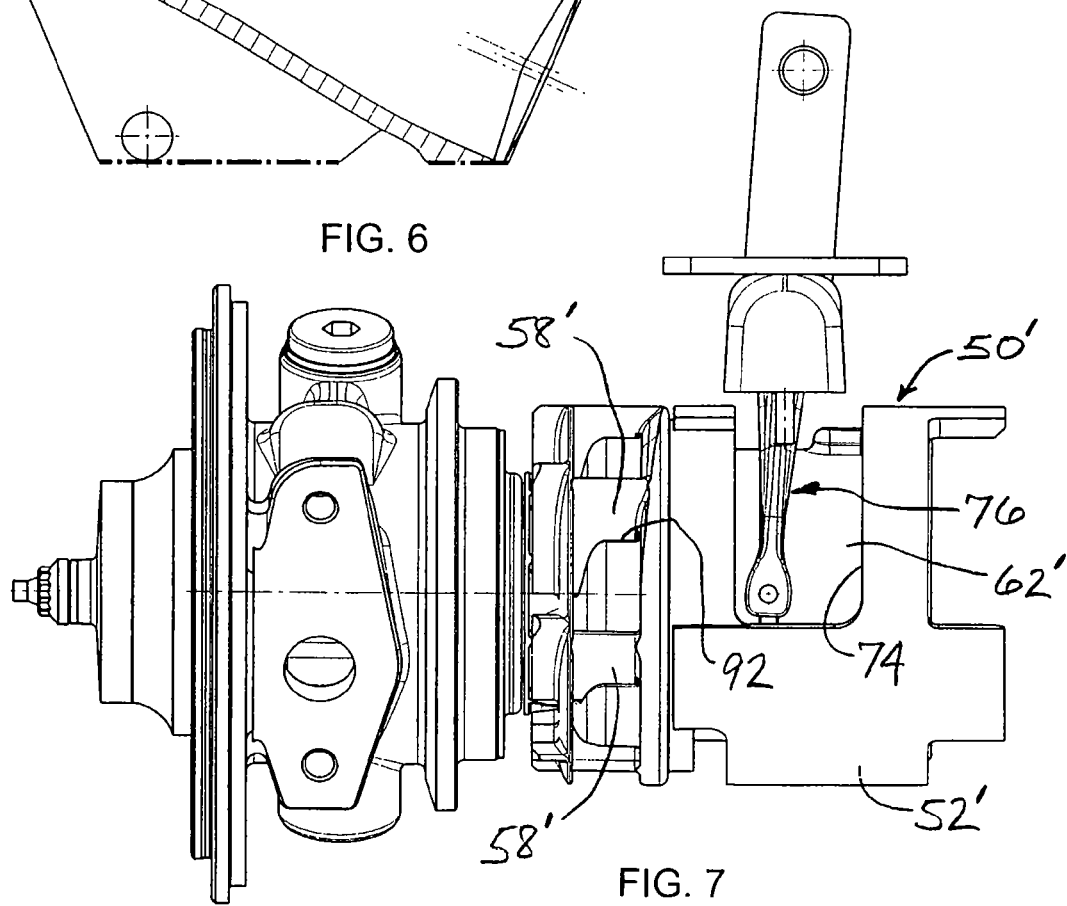
FIG. 7 is a side elevation of a subassembly of the turbocharger.

Actuation of the piston 62 will now be described. The carrier 52 includes a pair of apertures (not shown in this embodiment, but shown in subsequent embodiments described below) through the side wall of the carrier at diametrically opposite locations. A fork member 76 has a pair of arms 78 whose distal ends extend through the apertures 74 (FIG. 7) in the carrier and engage the piston 62 at diametrically opposite locations of the piston. The arms 78 are joined at their proximal ends to a base 80 that is rotatable about an axis that is transverse relative to the rotation axis of the turbine wheel 40. Thus, rotation of the base of the fork member in one direction or the other is converted by the arms 78 into axial displacement of the piston 62 in one direction or the other within the carrier 52. The fork member 76 is coupled by a suitable linkage (not shown) to an actuator (not shown) such as a vacuum chamber actuator or other suitable actuator for causing rotation of the fork member. This arrangement for effecting axial movement of the piston 62 is advantageous in that no part of the mechanism for moving the piston is disposed in the exhaust gas stream.

Figure 5:
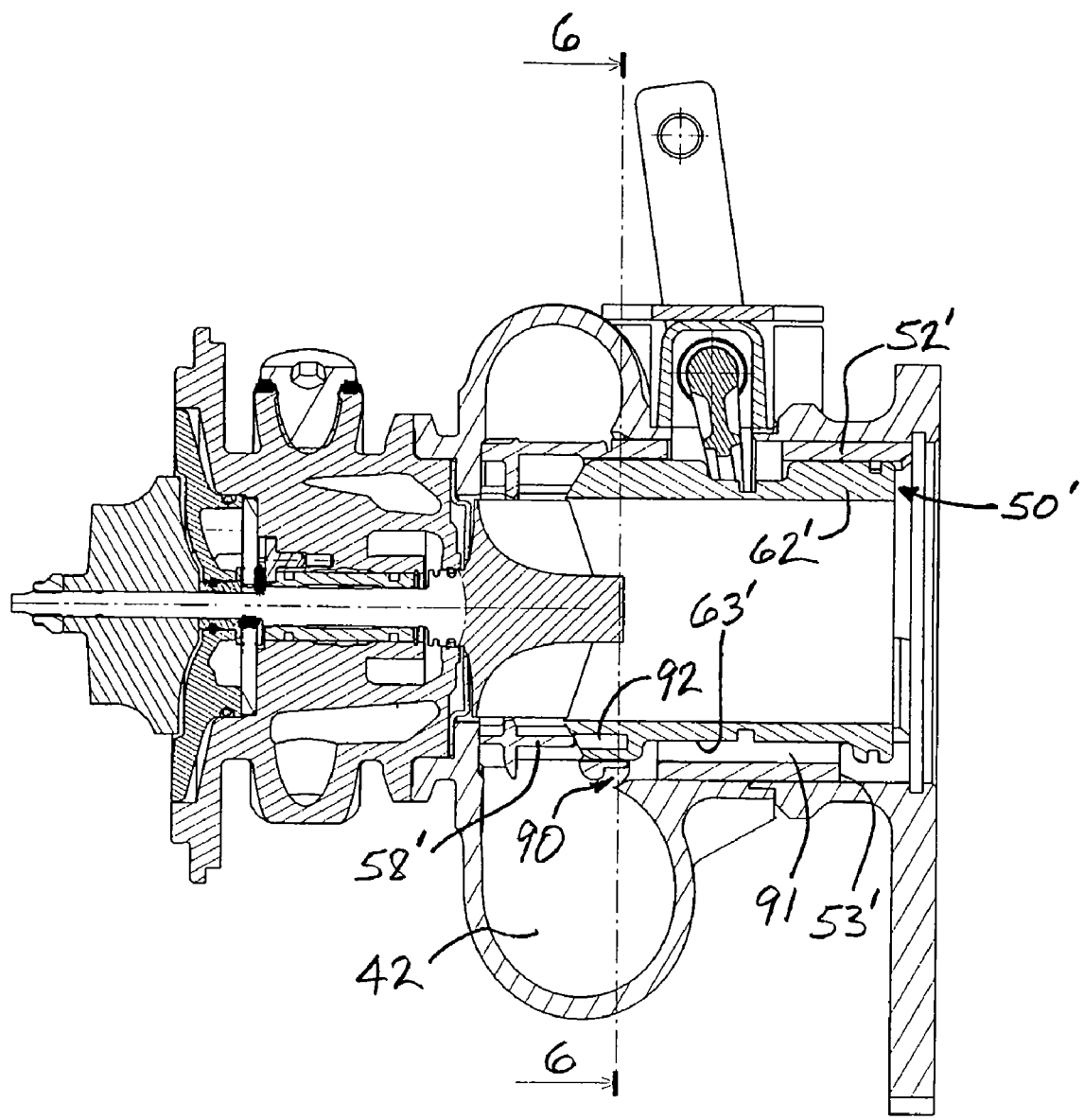
FIG. 5 is a view similar to FIG. 1, showing the piston in a fully open position.
Figure 6:
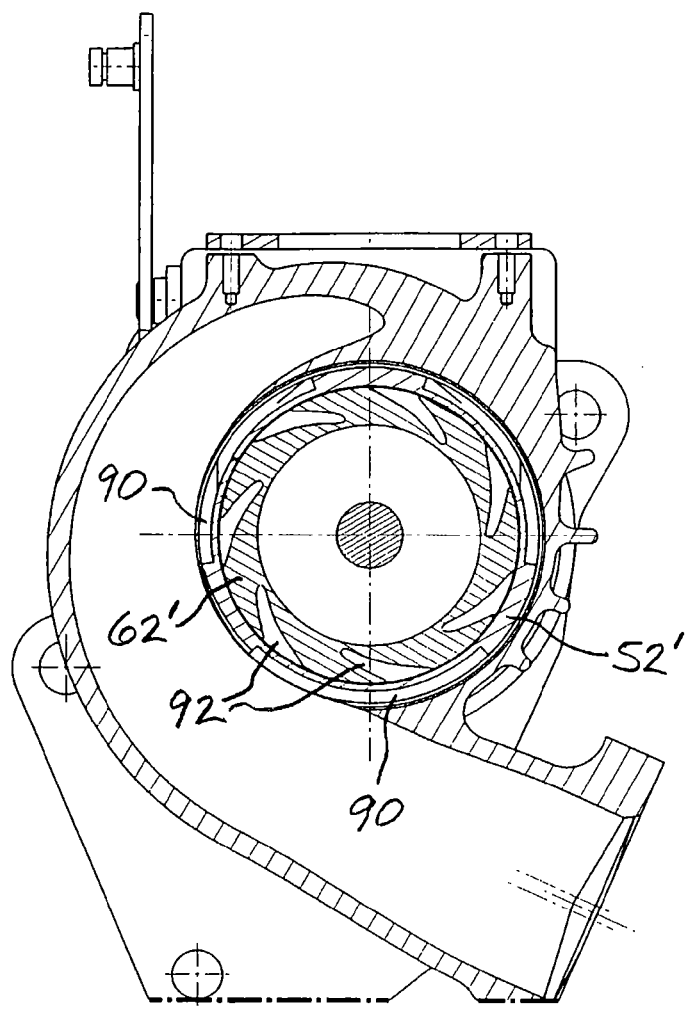
FIG. 6 is a cross-sectional view along line 6-6 in FIG. 5.

An alternative embodiment of the invention is illustrated in FIGS. 4 through 7. The turbocharger 20' shown in FIGS. 4 through 7 has a sliding piston cartridge 50' generally similar to the cartridge 50 described above, and aspects that are the same will not be repeated here. As best seen in FIG. 5 showing the piston in an open position, the carrier 52' of the cartridge 50' includes at least one bypass passage 90 that is blocked by the piston 62' in the closed position of the piston (FIG. 4), but that is unblocked when the piston is moved to the fully open position as shown in FIG. 5. The piston 62' has at least one recess 63' in its radially outer surface so as to define at least one cavity 91 between the outer surface of the piston and the inner surface of the carrier. Each cavity 91 is arranged to be connected with at least one bypass passage 90 when the piston is moved to its open position (FIG. 5). Additionally, the carrier has at least one cutout 53' at its downstream end so that when the piston is moved to the open position an opening develops between the downstream end of the piston and the downstream end of the carrier defined by the cutout 53'. In this manner, when the piston is fully opened, exhaust gas flows from the chamber 42 through the bypass passage(s) 90 into the cavity or cavities 91 and finally out through the opening between the downstream end of the piston and the downstream end of the carrier. The bypass passage 90 thus allows some proportion of the exhaust gas flow to pass from the chamber 42 through the bypass passage 90, thereby bypassing the turbine wheel and also bypassing the central passage of the piston. The flow bypassed via the bypass passage 90 can be in addition to or instead of the "internal bypass" flow as previously described. The bypass passage thus allows a greater amount of total bypass flow.

The piston 62' at its upstream end includes a plurality of recesses or slots 92 that extend axially into the upstream end face of the piston for receiving vanes 58' of the carrier 52'. The provision of the slots 92 improves the sealing between the piston and the vanes so as to discourage exhaust gas from leaking through gaps between the piston and the vanes but rather to encourage the exhaust gas to flow through the spaces between adjacent vanes.

Figure 9:
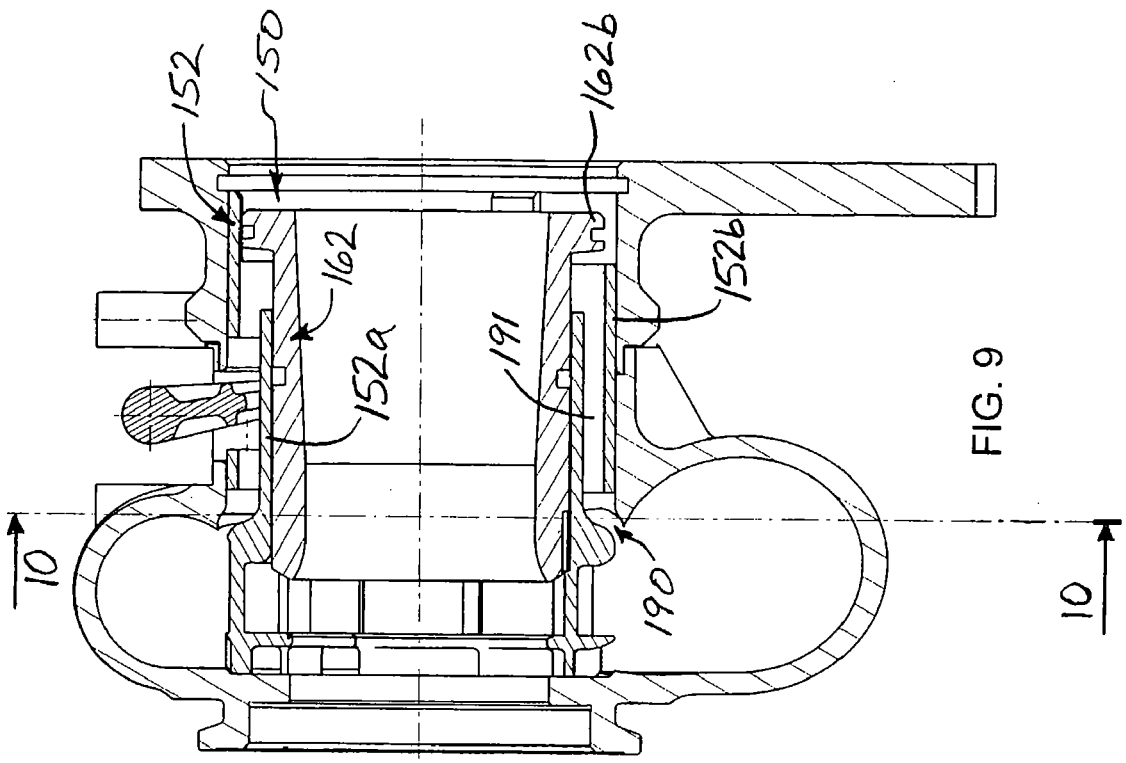
FIG. 9 is a view similar to FIG. 8, with the piston in an open position.
Figure 8:
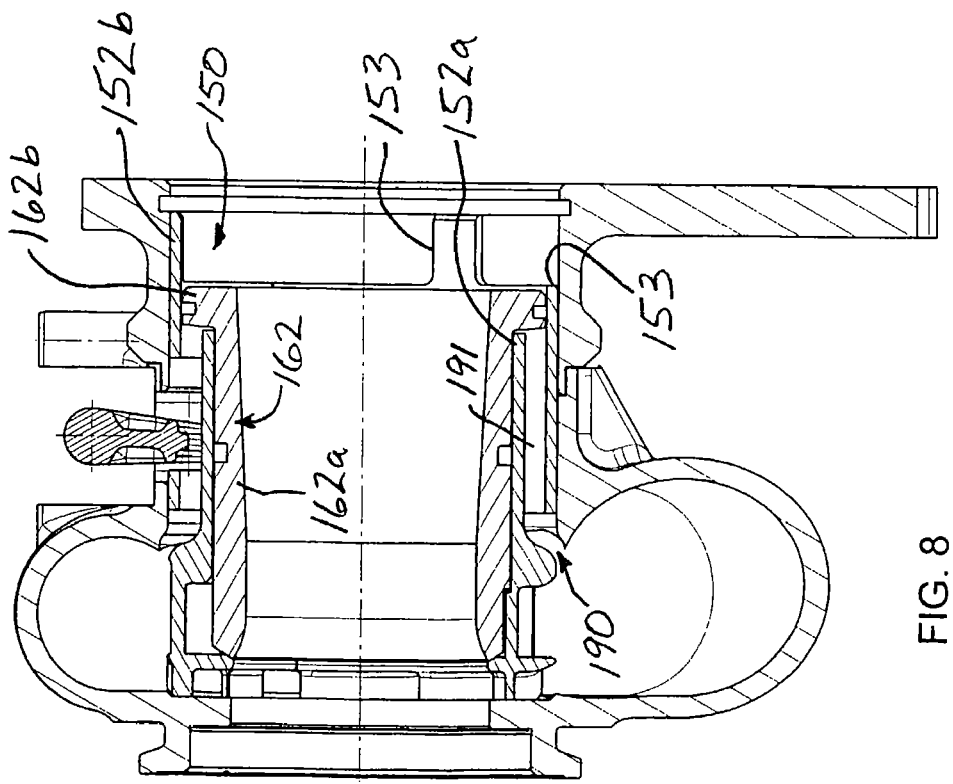
FIG. 8 is a cross-sectional view of a turbine assembly for a turbocharger in accordance with a third embodiment of the invention, showing the piston in a closed position.
Figure 10:
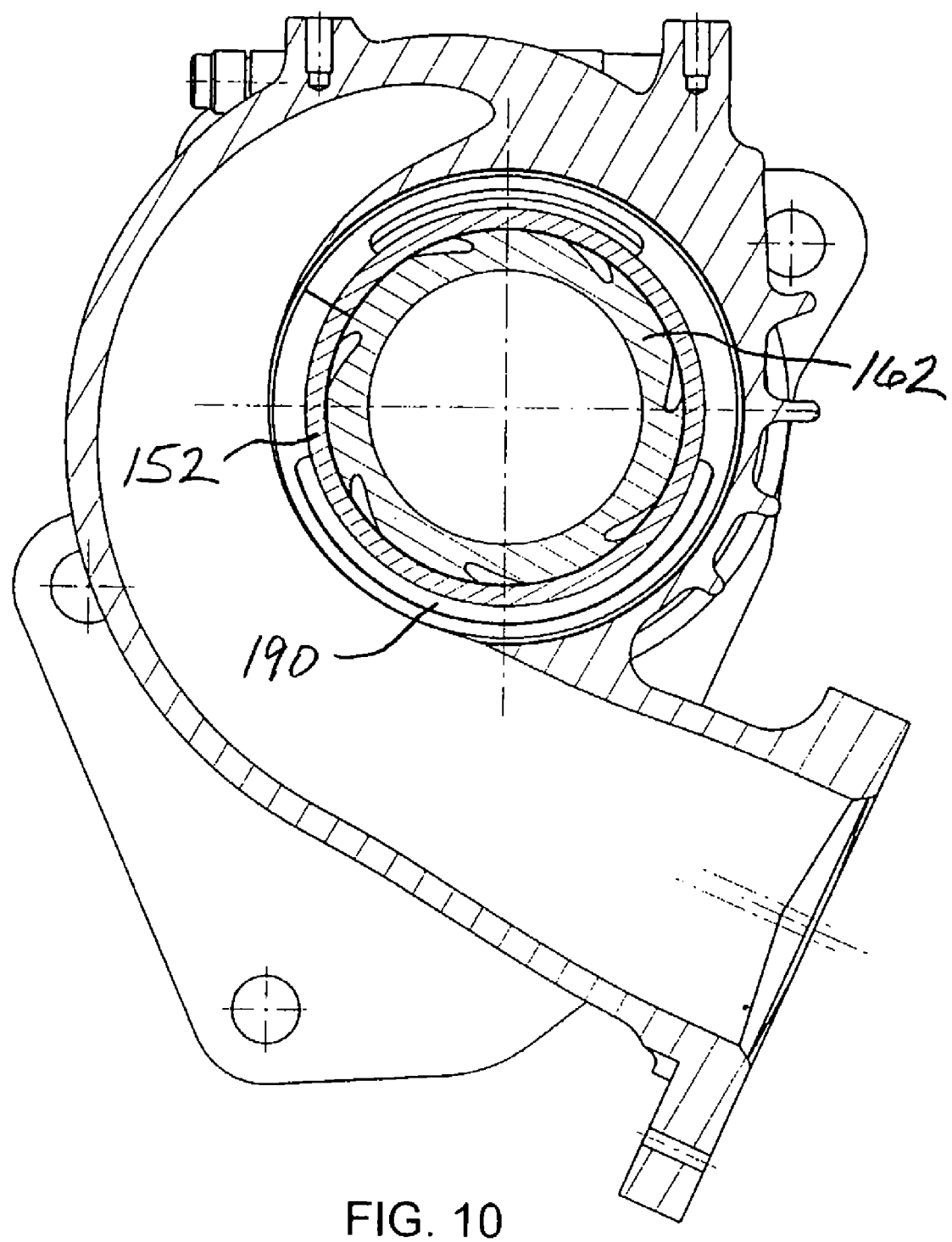
FIG. 10 is a cross-sectional view along line 10-10 in FIG. 9.

A third embodiment of the invention is illustrated in FIGS. 8 through 10 showing a turbine assembly for a turbocharger. The turbine assembly includes a sliding piston cartridge 150. The cartridge comprises a carrier 152 and a sliding piston 162. The piston cartridge is generally similar to that of the second embodiment, except that the tubular carrier 152 defines a generally annular cavity 191 formed in the wall thickness of the tubular carrier and extending axially along the carrier. The upstream end of the cavity 191 connects with at least one bypass passage 190 formed through the upstream end face of the carrier 152. The annular cavity 191 results in the carrier 152 having a radially inner tubular portion 152a and a radially outer tubular portion 152b. The piston 162 includes an upstream portion 162a of relatively smaller diameter that slidably engages the inner tubular portion 152a, and a downstream portion 162b of greater diameter that slidably engages the outer tubular portion 152b of the carrier. The downstream end of the outer tubular portion 152b has at least one cutout 153 arranged so that when the piston is moved to its fully open position (FIG. 9) an opening develops between the downstream portion 162b of the piston and the outer tubular portion 152b of the carrier so as to allow exhaust gas to bypass the turbine wheel by passing through the bypass passage 190, through the annular cavity 191 of the carrier, and out through the opening between the downstream portion 162b of the piston and the outer tubular portion 152b.

In the various embodiments of the invention as described above, the sliding piston cartridge can be structured and arranged to be insertable into and removable from the turbine housing bore as a unit. Additionally or alternatively, the carrier can have an axial length exceeding that of the piston and the piston can be arranged with respect to the carrier such that the downstream end of the piston does not project axially beyond the downstream end of the carrier in the open position of the piston.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger comprising:
    a center housing (22) containing a bearing assembly and a rotary shaft (26) mounted in the bearing assembly;
    a compressor wheel (24) affixed to one end of the shaft (26);
    a turbine wheel (40) affixed to an opposite end of the shaft (26) and disposed in a bore (44) of a turbine housing (38) that is coupled to an opposite side of the center housing (22), the turbine housing (38) defining a chamber (42) surrounding the turbine wheel (40) for receiving exhaust gas to be directed into the turbine wheel (40); and
    a sliding piston cartridge (50, 50', 150)) comprising:
        a carrier (52, 52', 152) inserted axially into the bore (44) of the turbine housing (38) with a radially outer surface of the carrier (52) engaging an inner surface of the bore (44), the carrier (52, 52', 152) having a tubular portion (54) defining a central bore therethrough substantially coaxial with the turbine housing bore (44), the tubular portion (54) having an upstream end and a downstream end with respect to a flow direction of exhaust gas through the central bore, the carrier (52, 52', 152) further comprising an array of circumferentially spaced vanes (58) axially projecting from the upstream end of the tubular portion (54), the vanes (58) having fixed ends joined to the tubular portion (54) and free ends that are adjacent a wall (60) of the turbine housing (38), the tubular portion (54) defining circumferentially spaced openings (66) downstream of the fixed ends of the vanes (58), connecting portions (72, 58') being defined between the openings (66), the vanes (58) defining a first nozzle portion and the circumferentially spaced openings (66) and connecting portions (72, 58') defining a second nozzle portion for directing exhaust gas from the chamber into the turbine wheel (40); and
        a tubular piston (62, 62', 162) disposed in the central bore of the carrier (52, 52', 152) such that the piston (62, 62', 162) is axially slidable relative to the carrier (52, 52', 152) between a closed position and an open position, the piston (62, 62', 162) in the closed position substantially blocking exhaust gas from passing through the second nozzle portion to the turbine wheel (40), the piston (62, 62', 162) progressively unblocking the second nozzle portion as the piston (62, 62', 162) travels toward the open position.

2. The turbocharger of claim 1, wherein the tubular portion (54) of the carrier (52, 52', 152) defines a ring (68) disposed between the fixed ends of the vanes (58) and the circumferentially spaced openings (66), the ring (68) having a portion (70) that extends radially inwardly and is positioned to be abutted by an upstream end of the piston (62, 62', 162) in the closed position thereof.

3. The turbocharger of claim 1, wherein the connecting portions (72, 58') are shaped as vanes.

4. The turbocharger of claim 1, wherein the sliding piston cartridge (50, 50', 150) is configured such that when the openings (66) in the carrier (52, 52', 152) are fully unblocked by the piston (62, 62', 162), some of the exhaust gas flowing inwardly through the openings (66) bypasses the turbine wheel (40) and flows directly into the central passage of the piston (62, 62', 162).

5. The turbocharger of claim 1, wherein the sliding piston cartridge (50, 50', 150) is insertable into and removable from the turbine housing bore (44) as a unit.

6. The turbocharger of claim 5, wherein the carrier (52, 52', 152) has an axial length exceeding that of the piston (62, 62', 162).

7. The turbocharger of claim 6, wherein the piston (62, 62', 162) is arranged with respect to the carrier (52, 52', 152) such that a downstream end of the piston (62, 62', 162) does not project axially beyond the downstream end of the carrier (52, 52', 152) in the open position of the piston (62, 62', 162).

8. The turbocharger of claim 1, wherein the tubular portion (54) of the carrier (52, 52', 152) defines a pair of circumferentially spaced apertures (74) passing through a side wall of the tubular portion (54), and further comprising a mechanism for sliding the piston in the carrier, the mechanism comprising a pair of arms (78) having distal ends that extend through the apertures (74) in the side wall and engage the piston (62, 62', 162).

9. The turbocharger of claim 8, wherein the arms (78) have proximal ends joined to a base (80), the arms (78) and base (80) forming a fork member (76), the fork member (76) being rotatable about an axis that extends transversely relative to an axis of the piston (62, 62', 162) such that the arms (78) axially move the piston (62, 62', 162).

10. The turbocharger of claim 1, wherein the cartridge (50', 150) defines at least one bypass passage (90, 190), the at least one bypass passage (90, 190) being positioned to be blocked by the piston (62', 162) when the piston (62', 162) is in the closed position and to be uncovered by the piston (62', 162) when the piston (62', 162) is moved toward the open position such that a portion of exhaust gas flows from the chamber (42) through the at least one bypass passage (90, 190) and bypasses the bore (44) of the turbine housing (38).

11. The turbocharger of claim 10, wherein the at least one bypass passage (90, 190) is defined in the carrier (52', 152), and further comprising at least one cavity (91, 191) formed between a radially outer surface of the piston (62', 162) and a radially inner surface of the carrier (52', 152) and connected with the at least one bypass passage (90, 190).

12. The turbocharger of claim 11, wherein the downstream end of the tubular portion of the carrier (52', 152) defines at least one cutout (53', 153) so that when the piston (62', 162) is moved to the open position an opening develops between the downstream end of the piston (62', 162) and the downstream end of the carrier (52', 152) defined by the cutout (53', 153), the opening being connected to the at least one cavity (91, 191) so as to allow said portion of exhaust gas to exit from the at least one cavity (91, 191) through the opening.

13. The turbocharger of claim 10, wherein the at least one bypass passage (90, 190) is formed through an upstream end face of the tubular portion of the carrier (52', 152), and wherein the tubular portion of the carrier (52', 152) defines a generally annular cavity (91, 191) formed in a wall thickness of the tubular portion and extending axially therealong, an upstream end of the annular cavity (91, 191) connecting with the at least one bypass passage (90, 190).

14. The turbocharger of claim 13, wherein the annular cavity (191) results in the tubular portion of the carrier (152) having a radially inner tubular portion (152a) and a radially outer tubular portion (152b), the piston (162) including an upstream portion (162a) of relatively smaller diameter that slidably engages the inner tubular portion (152a) and a downstream portion (162b) of greater diameter that slidably engages the outer tubular portion (152b), a downstream end of the outer tubular portion (152b) defining at least one cutout (153) arranged so that when the piston (162) is moved to the open position an opening develops between the downstream portion (162b) of the piston (162) and the outer tubular portion (152b) of the carrier (152) so as to allow exhaust gas to bypass the turbine wheel by passing through the at least one bypass passage (190), through the annular cavity (191), and out through the opening between the downstream portion (162b) of the piston (162) and the outer tubular portion (152b) of the carrier.

15. The turbocharger of claim 1, wherein an upstream end of the piston (62') defines a plurality of slots (92) extending axially thereinto for receiving the connecting portions (58') of the carrier (52').

* * * * *